(12) United States Patent
Alidedeoglu et al.

(10) Patent No.: US 10,899,875 B2
(45) Date of Patent: Jan. 26, 2021

(54) CONTINUOUS PROCESS FOR MAKING POLYBUTYLENE TEREPHTHALATE USING PURIFIED TEREPHTHALIC ACID AND 1,4-BUTANE DIOL

(71) Applicant: SABIC Global Technologies B.V., Bergen op Zoom (NL)

(72) Inventors: Husnu Alp Alidedeoglu, Newburgh, IN (US); Prashant Kumar, Evansville, IN (US); Brian Bougher, Evansville, IN (US); Cornelis Adrianus Maria van Gool, Kapellen (BE); Sasi Sethumadhavan Kannamkumarath, Evansville, IN (US); Bing Zhou, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 198 days.

(21) Appl. No.: 16/298,235

(22) Filed: Mar. 11, 2019

(65) Prior Publication Data

US 2019/0263963 A1 Aug. 29, 2019

Related U.S. Application Data

(62) Division of application No. 15/542,677, filed as application No. PCT/EP2016/051886 on Jan. 29, 2016, now Pat. No. 10,344,119.

(60) Provisional application No. 62/110,029, filed on Jan. 30, 2015, provisional application No. 62/242,403, filed on Oct. 16, 2015, provisional application No. 62/262,563, filed on Dec. 3, 2015.

(51) Int. Cl.
*C08G 63/183* (2006.01)
*C08G 63/78* (2006.01)

(52) U.S. Cl.
CPC ......... *C08G 63/183* (2013.01); *C08G 63/785* (2013.01); *B01J 2219/00006* (2013.01)

(58) Field of Classification Search
CPC .... C08G 63/785; C08G 63/78; C08G 63/183; C08G 63/16; C08G 18/4219; C08G 18/4241; C08G 18/73; C08G 2230/00; C08G 63/127; C08G 63/181; C08G 63/20; C08G 63/60; B01J 19/1887; B01J 2219/0011; B01J 2219/00166; B01J 2219/00085; B01J 2219/00087; B01J 2219/00006; B01J 19/247; B01J 2219/00094; B01J 2219/00103; B01J 2219/00162; B01J 2219/00247
See application file for complete search history.

(56) References Cited

U.S. PATENT DOCUMENTS

| | | | |
|---|---|---|---|
| 4,680,376 A | 7/1987 | Heinze et al. | |
| 7,115,701 B2 | 10/2006 | Schultz Van Endert et al. | |
| 7,259,227 B2 | 8/2007 | Schulz Van Endert et al. | |
| 7,608,225 B2 | 10/2009 | Schulz Van Endert et al. | |
| 8,110,149 B2 | 2/2012 | Schulz Van Endert | |
| 8,252,888 B2 | 8/2012 | Van Endert | |
| 2005/0163679 A1* | 7/2005 | Schulz Van Endert | B01J 19/1887 528/271 |
| 2007/0116615 A1* | 5/2007 | Schulz Van Endert | B01J 19/247 422/134 |

OTHER PUBLICATIONS

International Search Report; International Application No. PCT/EP2016/051886; International Filing Date: Jan. 29, 2016; dated Apr. 4, 2016; 3 pages.
Written Opinion; International Application No. PCT/EP2016/051886; International Filing Date: Jan. 29, 2016; dated Apr. 4, 2016; 6 pages.

* cited by examiner

Primary Examiner — Ling Siu Choi
Assistant Examiner — Gennadiy Mesh
(74) Attorney, Agent, or Firm — Cantor Colburn LLP

(57) ABSTRACT

A device for making polybutylene terephthalate includes (1) a slurry paste vessel; (2) a tower reactor to which a mixture of 1,4-butane diol and terephthalic acid from vessel (1) is supplied, the tower reactor having a plurality of reactor zones wherein the lower third of the tower reactor is in the form of a hydrocyclone with attached heat exchanger, and the hydrocyclone has a supply line from vessel (1), the hydrocyclone being connected to the top side of the tower reactor; (3) a first continuously stirred tank reactor to which the product from tower reactor (2) is supplied; (4) an optional second continuously stirred tank reactor to which the product from (3) is supplied; (5) a dual shaft ring reactor to which the product from stirred tank reactor (3) or (4), is supplied; and (6) a pelletizer where the product from dual shaft ring reactor (5) is continuously fed and pelletized.

1 Claim, 1 Drawing Sheet

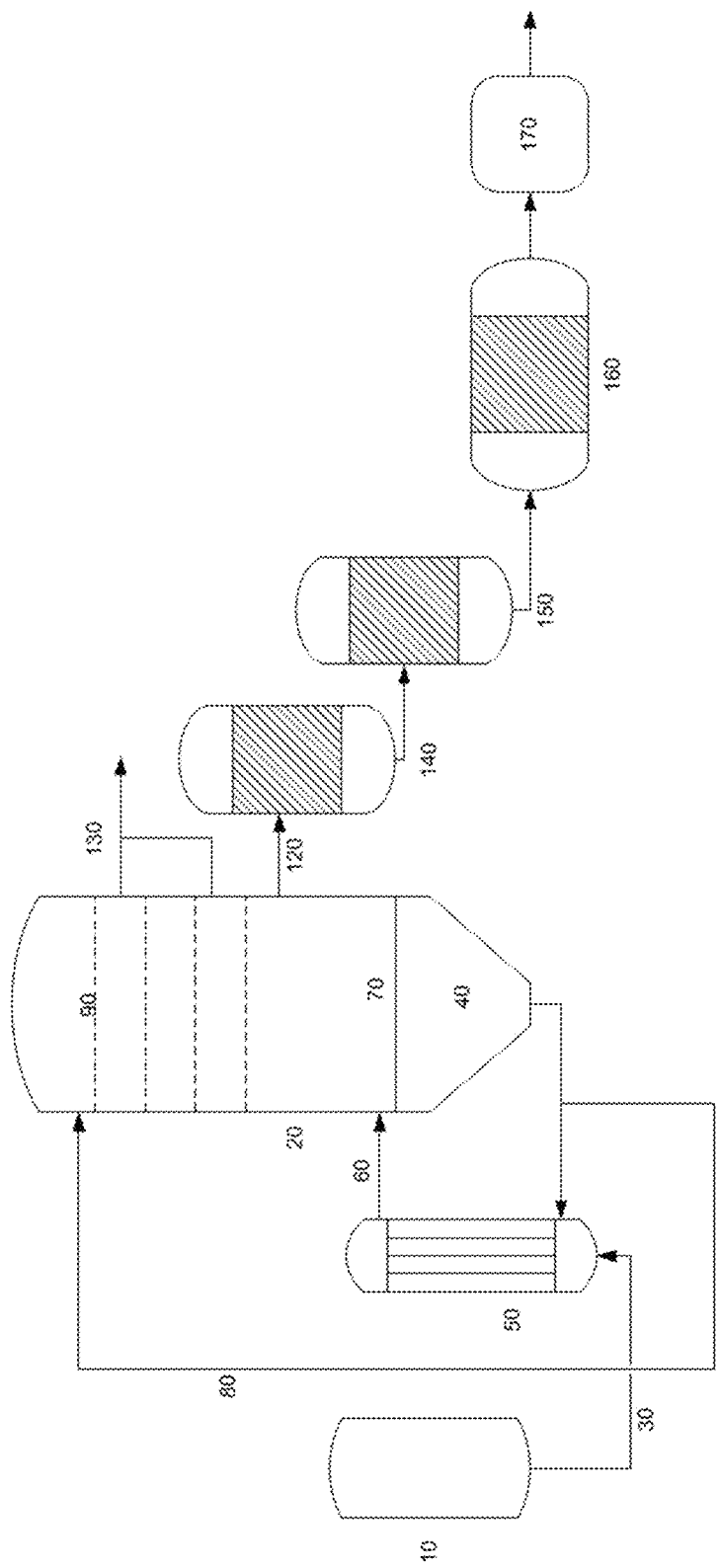

CONTINUOUS PROCESS FOR MAKING POLYBUTYLENE TEREPHTHALATE USING PURIFIED TEREPHTHALIC ACID AND 1,4-BUTANE DIOL

CROSS REFERENCE TO RELATED APPLICATIONS

This application is a divisional application of application Ser. No. 15/542,677, filed Jul. 11, 2017, which is a 371 of International Application No. PCT/EP2016/051886, filed Jan. 29, 2016, which claims priority to U.S. Provisional Application Nos. 62/110,029, filed Jan. 30, 2015, 62/242, 403, filed Oct. 16, 2015, and 62/262,563, filed Dec. 3, 2015, which are incorporated herein by reference in their entireties.

FIELD OF THE INVENTION

Disclosed is a continuous process and device for making polybutylene terephthalate (PBT) resin, particularly high molecular weight PBT resin. Also disclosed is a monitoring process for determining the carboxylic acid end group concentration of the resulting PBT.

BACKGROUND OF THE INVENTION

Polybutylene terephthalate (PBT) resins are semicrystalline thermoplastics used in a variety of durable goods. PBT resins are now widely used for components in the electronics and automotive industries. As these market sectors continue to expand and evolve, demand for PBT has continued to grow. Thus, in 2009, worldwide consumption of PBT was reported to total 750 kilotons. Demand for PBT is projected to increase at least 5 percent per year, leading to a projected demand of 1300 kilotons by the year 2020.

PBT resins are commercially produced by two general processes. The first process occurs in two stages and uses dimethyl terephthalate (DMT) as a starting raw material. In the first stage of the process (hereinafter referred to as "the DMT Process"), DMT is trans-esterified with 1,4-butanediaol (BDO) in the presence of a catalyst to form intermediate weight oligomers, together with methanol (MeOH) which is a byproduct that is removed. In the second stage, high molecular weight PBT polymer is produced by polycondensation of intermediate oligomers under reduced pressure and high temperature.

In a typical example of the DMT Process, PBT is commercially manufactured using DMT and BDO through a continuous melt poly-condensation process in the presence of a catalyst, typically tetra-isopropyl titanate (TPT). In a typical variant, PBT resin production employs continuous five-stage reactors followed by a finisher or Disc Ring Reactor (DRR). In the first three reactors, DMT undergoes reaction with BDO. Transesterification results in the formation of an intermediate polymer (or oligomer or mixture of oligomers) with an intrinsic viscosity (IV) of 0.14±0.02 deciliter/gram (dl/g) and a carboxylic acid end group (CEG) concentration equal to approximately 5 millimoles/kilogram (mmol/kg). The overheads include methanol (MeOH), tetrahydrofuran (THF), water ($H_2O$), and unreacted BDO, which are sent to a distillation column for recovery of MeOH and THF. Excess BDO is recovered as column bottom and recycled back to the process. MeOH and THF are recovered as column overheads and are sold as a valuable by-product. The oligomers are then transferred to the pre-polycondensation section where low molecular weight PBT is formed (IV=0.29±0.01 dl/g, CEG≤10 mmol/kg) at exit. The low molecular weight PBT is subsequently fed into the polycondensation reactor (for example, a disc ring reactor, or DRR) where the desired molecular weight PBT is produced (IV=0.4-1.25 dl/g, CEG=10-55 mmol/kg).

The second process—which is also a two-stage process—uses purified terephthalic acid (PTA) as a starting material. In the first stage of the process (hereinafter the "PTA Process"), direct esterification of PTA with excess BDO occurs in the presence of a catalyst to form a heterogeneous reaction mixture. Since PTA is insoluble in BDO, the "clearing point" (defined as the point where reaction medium turns into a clear homogeneous melt) of the solution can be taken as an indicator of the complete or almost-complete reaction of PTA with BDO. The specification of "clearing point" and the formation of intermediate oligomers at this stage are typically not well defined, due in part to the fact that CEG concentration and IV vary depending on reaction conditions such as BDO to PTA ratio, reaction temperature, operating pressure, residence time, and reflux ratio. The second stage of the PTA Process involves polycondensation. The polycondensation is typically conducted at a higher temperature than the direct esterification of the first stage and usually at reduced pressure.

Variation in CEG concentration after the first stage of the PTA Process can have downstream consequences for the rest of the process, particularly at the polycondensation stage. This translates into variations in CEG concentration in the resulting PBT resin. In the current manufacture of PBT resins using the PTA Process, IV typically increases during the polycondensation step with a simultaneous decrease in CEG concentration. However, depending on the residence time of the polycondensation step, the CEG concentration can potentially increase due to side reactions such as through a back-biting reaction of the BDO end groups. The uncertainty associated with variability in the reaction conditions and times for the PTA Process (particularly when the process is continuous) makes controlling CEG concentration in the PBT polymer resin a challenge.

For the past 30 years, the DMT route for producing PBT has been the global method of choice, due to ready access to DMT and to the problems associated with the PTA process. However, the dynamics of global DMT supply have given rise to serious DMT sourcing and pricing challenges. The price of DMT has risen significantly in the last several years, due in part to the rising cost of para-xylene and to supply chain changes. Some DMT suppliers are exiting the DMT production market altogether, giving rise to a reduction of DMT supply. Global supply of DMT is therefore limited. Taken together, these challenges have adversely impacted PBT resin production via the first method, consequently resulting in increased Total Variable Cost (TVC) of PBT production.

Furthermore, there are additional benefits to the use of PTA over DMT in the production of PBT. As PTA is a liquid at ambient conditions (23° C., 1 bar), whereas DMT is solid under such conditions, PTA is easier to transport and store. Also, the use of PTA instead of DMT eliminates the production of methanol as byproduct of the PBT synthesis, as in the esterification of PTA with BDO, the main byproduct that is produced is water. This leads to an elimination of the need for unit operations directed at recovery and processing of methanol in the PBT production process.

As a result, there is a need for new or improved processes for preparing PBT that do not use DMT as a starting material. More particularly, there is a need for an improved process for making PBT that employs PTA as a starting material that eliminates or reduces the problems associated with the PTA Process described above.

These and other needs are met by the present invention which is directed to a continuous process for preparing polybutylene terephthalate, comprising:
(a) combining 1,4-butane diol (BDO) and purified terephthalic acid (PTA) in a slurry paste vessel to form a mixture;
(b) continuously supplying the mixture from step (a) to a tower reactor having a plurality of reactor zones for at least one of esterification or transesterification; wherein the following conditions are maintained:
  (b1) the mixture from step (a) is subjected to the esterification section with a treatment temperature in the range of 170 to 270° C. and a treatment pressure in the range of 0.5 to 1 bar; a first quantity of catalyst is supplied;
  (b2) the product of step (b1) is transferred continuously into a pipe stretch while optionally a quantity of BDO is supplied;
  (b3) the product of step (b2) is transferred continuously to a cascade postesterification part of the tower reactor, comprising multiple cascades in series, preferably four cascades in series, wherein the pressure of each cascade is subsequently reduced to ultimately ≤1.25 bar, preferably ≤0.20 bar and optionally a second quantity of catalyst is supplied into the last cascade zone of the post-esterification part of the tower reactor;
(c) the product obtained from step (b3) is continuously supplied to a first continuously stirred tank reactor, wherein the product of step (b3) is subjected to a melt temperature of 225 to 250° C., a pressure of 5 to 40 mbar, and a residence time between 10 and 60 minutes;
(d) optionally, the product obtained from step (c) is continuously supplied to a second continuously stirred tank reactor, wherein the product of step (c) is subjected to a melt temperature of 230 to 260° C., a pressure of 0.1 to 35 mbar, and a residence time between 10 and 60 minutes; and
(e) the obtained product from step (c) or, where a second continuously stirred tank reactor (d) is used, from step (d), is continuously transferred to a continuous polycondensation reactor wherein the product of step (d) is subjected to a melt temperature of 230 to 255° C., a pressure of 0.1 to 16 mbar, and a residence time of 30 minutes to 6 hours.

Such process allows for the production of polybutylene terephthalate having a desired balanced of high intrinsic viscosity (IV) and low carboxylic end group using PTA as raw material. Particularly, steps (a) and (b) allow for the production of a butylene terephthalate oligomer starting from PTA and BDO, having a CEG higher than in the continuous process using BDO and DMT, wherein in the steps (c), (d) and (e), the butylene terephthalate oligomer is converted to a PBT end product have a desired balance of IV and CEG similar to the PBT produced in the continuous process using BDO and DMT.

More particularly, such process allows for the conversion of a butylene terephthalate oligomer produced using PTA and BDO as raw material, having a higher CEG at given IV than is the case for butylene terephthalate oligomers produced using DMT and BDO, to a PBT having CEG at given IV similar to the PBT produced via the process where DMT and BDO are used as raw materials.

Preferably, the pressure in the first continuously stirred tank reactor of step (c) is 5 to 30 mbar. Such low pressure provides an even better balance of CEG and IV in the PBT end product.

Preferably, the PTA comprises at least 99 weight percent terephthalic acid.

The catalyst preferably is one selected from
 titanium alkoxides, preferably tetraisopropyl titanate, tetraisobutyl titanate, tetra tert-butyl titanate, tetraphenyl titanate, tetraethylhexyl titanate, bis(alkanediolato) titanates, or reaction products thereof with a phosphorous compound, preferably phosphoric acid, monoalkyl phosphate or monoaryl phosphate;
 tin-containing compounds, preferably tin diacetate, tin dioctoate, tin dilaurate, dibutyl tin dilaurate, dibutyl tin acetate;
 zirconium-containing compounds, preferably tetra-n-propyl zirconate, tetra-n-butyl zirconate,
 and/or combinations thereof.

Preferably, the catalyst is a tin alkoxide, such as tetraisopropyl titanate, tetraisobutyl titanate or tetra tert-butyl titanate. Most preferably, the catalyst is tetraisopropyl titanate.

The quantity of catalyst supplied in step (b1) may for example be ≥40 ppm and ≤250 ppm, preferably ≥50 ppm and ≤200 ppm, more preferably ≥70 ppm and ≤150 ppm, with regard to the total weight of the PTA and the BDO supplied. Preferably, ≥70 ppm and ≤150 ppm of tetraisopropyl titanate is supplied is step (b1).

The quantity of catalyst supplied in step (b3) may for example be ≥50 ppm and ≤250 ppm, preferably ≥70 ppm and ≤200 ppm, more preferably ≥70 ppm and ≤150 ppm, with regard to the total weight of the PTA and the BDO supplied, and reaction products thereof. Preferably, ≥70 ppm and ≤150 ppm of tetraisopropyl titanate is supplied is step (b3).

The continuous polycondensation reactor (e) is preferably a dual shafts disc ring reactor with independent revolutions per minute (rpm) control.

It is further preferred that the process comprises:
(a) combining 1,4-butane diol (BDO) and purified terephthalic acid (PTA) in a mole ratio of 1.2:1 to 4:1 in a slurry paste vessel to form a mixture, wherein the temperature in the slurry paste vessel is in the range of 20 to 90° C., the pressure in the slurry paste vessel is in the range of 0.8 to 1.1 bar, and the residence time of the mixture in the slurry paste vessel is in the range of 1 to 4 hours;
(b) continuously supplying the mixture from step (a) to a tower reactor having a plurality of reactor zones for at least one of esterification or transesterification, wherein the esterification or transesterification occurs continuously, simultaneously, and uninterruptedly until prepolycondensation occurs; wherein the following conditions are maintained:
  (b1) the mixture from step (a) is subjected to the esterification section with a treatment temperature in the range of 170 to 270° C. and a treatment pressure in the range of 0.4 to 1 bar; a first quantity of between 60 and 120 ppm of an organo-titanate catalyst is supplied; the ratio of BDO to PTA is 1.6:1 to 3:1; and water, tetrahydrofuran (THF), and BDO are removed from the esterification section as overheads;
  (b2) the product of step (b1) is transferred continuously into a pipe stretch and maintained at a temperature in the range of 200 to 280° C. and a pressure in the range of 1 to 10 bar, while supplying 0.03 to 0.05 mol BDO;

(b3) the product of step (b2) is transferred continuously to a cascade postesterification part of the tower reactor, which consists of four different cascades, wherein the pressure of each cascade is subsequently reduced to ≤1.25 bar, preferably ≤0.20 bar, the temperature of each cascade is subsequently increased from 230 to 270° C., the residence time for each cascade is set between 2 and 30 minutes and a second quantity of TPT catalyst between 25 and 100 ppm diluted with 0.02 to 0.2 mol of BDO is supplied into the fourth cascade zone of the post-esterification part of the tower reactor;

(b4) water, THF, byproducts, and excess BDO from steps (b1), (b2), and (b3) are removed and the BDO is purified and directed back again to the individual reaction steps;

wherein
the plurality of reactor zones in the tower reactor of step (b) are configured such that the lower third of the tower reactor is in the form of a hydrocyclone with attached heat exchanger, and wherein the hydrocyclone has a supply line from the mixer of step (a);
the hydrocyclone is connected via a pressure pipe to the top side of the tower reactor;
the top side of the tower reactor is configured in the form of a downflow cascade; and
the cascade is in communication via a pipe with the central part of the tower reactor;

(c) the product obtained from step (b3) is continuously supplied to a first continuously stirred tank reactor, wherein the product of step (b3) is subjected to a melt temperature of 225 to 250° C., a pressure of 5 to 40 mbar, and a residence time between 10 and 60 minutes;

(d) the product obtained from step (c) is continuously supplied to a second continuously stirred tank reactor, wherein the product of step (c) is subjected to a melt temperature of 230 to 260° C., a pressure of 0.1 to 35 mbar, and a residence time between 10 and 60 minutes;

(e) the product from step (d) is continuously transferred to a dual shafts disc ring reactor with independent revolutions per minute (rpm) control, wherein the product of step (d) is subjected to a melt temperature of 230 to 255° C., a pressure of 0.1 to 16 mbar, a rotation rate for each of the dual shafts that is independently 1 to 5 rpm, and a residence time of 30 minutes to 6 hours; and (f) the product of step (e) is continuously fed into a pelletizer and is pelletized.

Preferably, in step (a), BDO and PTA are combined in a mole ratio of 1.35:1 to 2.5:1; in step (b3), the residence time for each cascade is between 5 and 25 minutes.

The temperature in the slurry paste vessel preferably is maintained between 70° C. and 90° C., the pressure is preferably maintained between 0.9 and 1.05 bar, and the residence time is preferably 2.5 to 3.5 hours.

It is further preferred that the mixture from step (a) is subjected to the esterification section of the tower reactor of step (b) wherein BDO and PTA are present in a mole ratio of 1.6:1 to 3.5:1, with a treatment temperature in the range of 230° C. to 250° C., a treatment pressure in the range of 0.5 to 0.9 bar and a residence time of 70 to 150 minutes; a first quantity of between 60 and 120 ppm of the catalyst, preferably tetraisopropyl titanate (TPT) is supplied; and water, tetrahydrofuran (THF), and BDO are removed from the esterification section as overheads.

It is even more preferred that the mixture from step (a) is subjected to the esterification section of the tower reactor of step (b) with a treatment temperature in the range of 240° C. to 250° C., a treatment pressure in the range of 0.6 to 0.8 bar, and a residence time of 80 to 120 minutes.

In step (b1), BDO and PTA are preferably present in a mole ratio of 1.8:1 to 3.0:1.

The product of step (b3) preferably has an intrinsic viscosity of between 0.1 and 0.2 dl/g and a carboxylic acid end group concentration of between 10 and 100 mmol/kg, with a conversion of between 95 and 99.5% based on free PTA.

It is further preferred that the product of step (b3) is subjected to a residence time of 30-50 minutes in the first and 30-50 minutes in the second continuously stirred tank reactors in series and is subjected to a melt temperature of 240 to 250° C.

The product leaving the second continuously stirred tank reactor preferably has an intrinsic viscosity of 0.22 to 0.40 dl/g and a carboxylic end group concentration of 0.1 to 30 mmol/kg.

In a certain embodiment, the obtained PBT has an intrinsic viscosity of 0.55 to 1.35 dl/g and a carboxylic acid end group concentration of 0.1 to 60 mmol/kg. More preferably, the obtained PBT has an intrinsic viscosity of 0.55 to 1.05 dl/g and a carboxylic acid end group concentration of 5.0 to 40 mmol/kg.

Furthermore, the obtained PBT is preferably is characterized by the following intrinsic viscosity, carboxylic acid end group concentration, and melt viscosity values:

(a) an intrinsic viscosity of 1.10 to 1.25 deciliters per gram, a carboxylic acid end group concentration of 35 to 45 millimoles per kilogram, and a melt viscosity of 750.0 to 950.0 Pa·s (7500 to 9500 poise) measured at 265° C.;

(b) an intrinsic viscosity of 0.95 to 1.0 deciliters per gram, a carboxylic acid end group concentration no greater than 40 millimoles per kilogram, and a melt viscosity of 350.0 to 450.0 Pa·s (3500 to 4500 poise) measured at 265° C.;

(c) an intrinsic viscosity of 0.78 to 0.82 deciliters per gram, a carboxylic acid end group concentration no greater than 40 millimoles per kilogram, and a melt viscosity of 145.0 to 185.0 Pa·s (1450 to 1850 poise) measured at 265° C.;

(d) an intrinsic viscosity of 0.68 to 0.72 deciliters per gram, a carboxylic acid end group concentration no greater than 24 millimoles per kilogram, and a melt viscosity of 74.0 to 90.0 Pa·s (740 to 900 poise) measured at 265° C.; or (e) an intrinsic viscosity of 0.55 to 0.59 deciliters per gram, a carboxylic acid end group concentration no greater than 12 millimoles per kilogram, and a melt viscosity of 20.0 to 40.0 Pa·s (200 to 400 poise) measured at 265° C.

In another aspect, the invention relates to monitoring of the CEG via a process comprising the steps of:

(a) dissolution of PBT polymer or oligomer in a mixture of solvents at room temperature;

(b) suppression of ionic formation by adding a second substance for sharp equivalence point determination; and (c) titration of solution against potassium hydroxide using potentiometric or colorimetric method after addition of Bromophenol blue indicator;

wherein mixture of solvents comprises hexafluoro-2-propanol, o-cresol, and dichloromethane;

wherein second substance is selected from the group consisting of salts comprising a cation selected from the group consisting of sodium, potassium, calcium, and ammonium; and an anion selected from the group consisting of trifluoroacetate, trifluoropropionate, and trifluoroborate.

Furthermore, the invention also relates in an embodiment to a device for operating the process according to the invention comprising:

(1) a slurry paste vessel, wherein 1,4-butane diol (BDO) and purified terephthalic acid (PTA) are combined to form a mixture;
(2) a tower reactor to which the product from (1) is supplied, having a plurality of reactor zones configured such that the lower third of the tower reactor is in the form of a hydrocyclone with attached heat exchanger, and wherein the hydrocyclone has a supply line from the vessel (1), the hydrocyclone being connected to the top side of the tower reactor, the top side of the tower reactor being configured in the form of a downflow cascade;
(3) a first continuously stirred tank reactor to which the product from (2) is supplied;
(4) an optional second continuously stirred tank reactor to which the product from (3) is supplied;
(5) a dual shaft ring reactor to which the product from (3) or, where a second continuous stirred tank reactor (4) is used, the product from (4), is supplied;
(6) a pelletizer where the product from (5) is continuously fed and pelletized.

The PBT process, device, and CEG monitoring process disclosed herein are characterized by various advantageous and unexpected attributes.

The PBT process and device are characterized by a unique design comprising an upstream tower reactor coupled with two downstream pre-condensation reactors and at least one disc ring reactor finisher. To the inventors' knowledge, this is the first time a PBT production process has been envisioned that makes use of the upstream advantages of a tower reactor with the downstream advantages of a continuously stirred tank reactor/disc ring reactor (CSTR/DRR) design. Particular advantages of the process include reduced time and cost in changing over PBT industrial production from the DMT process, because the CSTR and DRR components of PBT manufacturing plants can be combined with a tower reactor and repurposed. Moreover, the new process promises to reduce energy consumption and the TVC of PBT resin. The process is also capable of producing high purity THF as a by-product, which itself has resale value.

Finally the CEG monitoring process disclosed herein has a cycle time that is three times as fast as the process disclosed and routinely used in the art.

If a term in the present application contradicts or conflicts with a term in a reference, the term in the present application takes precedence over the conflicting term from the reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein all percent by weights are based on the total weight of the composition.

As used herein, the term "purified terephthalic acid" means terephthalic acid having a purity of at least 99 weight percent. Within this limit, the purity can be at least 99.5 weight percent, specifically at least 99.9 weight percent.

In general, multiple-stage reactor systems are used in the continuous production of PBT. The reactor systems typically comprise three to five different reaction vessels that are connected to each other. Polyester formation occurs over the course of a plurality of reaction steps which take place sequentially in stirred vessels. The steps include:
Esterification;
Transesterification;
Precondensation;
Polycondensation; and
Polyesterification.

Each of these steps has been modeled and studied. The mechanism of each of the steps is generally well understood.

Several commercial vendors focus on providing PBT production equipment and technology. The vendors include Hitachi, Uhde Inventa-Fischer, and Lurgi Zimmer AG. Each vendor takes a slightly different approach to PBT resin production.

The Hitachi process design possesses two types of reactor systems: (i) the Three Reactor System; and (ii) the Four Reactor System. The main feature of the Four Reactor System is its ability to produce PBT with high-grade viscosity and middle-grade viscosity at the same time owing to its ability to operate under low reaction temperature. The major characteristic of the Hitachi design disclosed in U.S. Pat. No. 7,179,433 as compared to the others is that the Hitachi polycondensation reactor where the prepolymer is produced is a vertical cylindrical polymerization vessel having a plurality of concentrically portioned reaction compartments. The Hitachi prepolycondensation reactor is equipped with stirring blades, a heater, and an outlet for volatile matter. The overall process is divided into four main steps/units: the premixing unit; the esterification unit; the precondensation unit; and the final polycondensation unit. In the process, PTA and BDO are fed first into a conditioning vessel for mixing and stirring. Then, mixed materials are fed into the calandria-type esterifying reactor for spontaneously circulating the process solution in the reactor by utilizing the spontaneous evaporation action of side reaction products formed by the esterification reaction. The oligomer is then transferred to the pre-condensation reactor containing several concentrical reaction compartments to obtain low molecular weight polymer.

In order to achieve high molecular weight resin, the low molecular weight product is fed into a finisher, which is a horizontal cylindrical vessel-type reactor equipped with a stirring rotor that rotates in the proximity of the inside wall of the vessel. To obtain PBT of high IV, a biaxial reactor can be used to deal with the high melt viscosity.

The Uhde Inventa-Fisher reactor technology is rooted in "the 2 R process", which comprises a tower reactor (Espree™), together with a finishing reactor (Discage™). In the Uhde Inventa Fischer process, all esterification, post-esterification and prepolycondensation processes occur in the tower reactor. The reaction steps are mainly performed in parallel to each other, rather than in sequence as in conventional technologies. The tower reactor is designed with new surface-active process and construction elements that reduce residence time, process temperature and pressure profiles. As a result, the tower does not require a mechanical stirring device. Also, reduction in thermal stress during the process decreases the amount of byproducts and discoloring of the polyester. The finisher reactor in the Uhde Inventa Fischer process is operated separately and creates the largest possible surface area for the polymer, thus reducing the residence time without dead spots.

The overall Uhde Inventa Fischer process starts with a paste mixer where PTA and BDO are fed into a slurry preparation vessel. Then, the slurry mixture was discharged into the hydrocyclone of the tower reactor for pre-esterification. A steady circular flow is maintained due to the thermosyphon effect with the external heat exchanger. The catalyst is added at this stage. The byproducts are collected and sent to a separation column. Then, the monomer/oligomer is sent into the top section of the tower-reactor via pressure pump through a monomer/oligomer line. The post-esterification reaction continues in three heated cascades whereby the monomer/oligomer flows from the top downwards. The generated flash vapor is passed through the monomer/oligomer mixture to receive an intensive intermix at reducing pressure for highest reaction rate. An additional catalyst is injected in the lowest cascade to activate the pre-polycondensation stage, which starts in the fourth cascade. The optimal conditions for prepolycondensation are set by controlling pressure and temperature. The reaction proceeds through a film evaporator. The prepolymer is collected in a sump and transferred into the finisher by a level controlled gear pump. A plug flow profile is achieved due to the specific arrangement of the punched discs and shaftless cage type agitator of high surface activity for fast diffusion. The characteristics of the final polymer are controlled by setting the appropriate temperature, vacuum, cage speed, and a residence time.

The Lurgi Zimmer process for PBT production via PTA/BDO starts with a mixer tank where PTA and BDO were mixed. Then, the premixed PTA and BDO are fed into the esterification section of the first reactor. During this reaction, a mixture composed mainly of water, THF, and BDO is evaporated and separated in a separation column. THF and water leave at the top of the column and THF is further transferred to a recovery unit. BDO exits as a bottom product and is returned to the esterification stage. The oligomer is then transferred to the prepolymer section, where the intrinsic viscosity of the melt is increased further under elevated temperature and further reduced pressure. High molecular weight PBT is produced in the polycondensation stage, which takes place in a special double drive disc ring reactor (DRR).

Process

The invention claimed by the Applicant combines an upstream tower reactor characteristic of the UHDE Inventa Fisher process with downstream CSTR and DRR components characteristic of the Lurgi Zimmer process, to achieve very high molecular weight polymer at lower production cost with reduced energy consumption and investment cost. In the overall process, a paste mixer is used where PTA and BDO are fed into a slurry paste vessel.

Then, the slurry mixture is discharged into the hydrocyclone of a tower reactor for pre-esterification. A steady circular flow is maintained due to the thermosyphon effect with the external heat exchanger. The catalyst is added at this stage. The byproducts are collected and sent to a separation column.

Then, the monomer/oligomer is sent into the top section of the tower-reactor via pressure pump through monomer/oligomer line. The postesterification reaction continues in three heated cascades whereby the monomer/oligomer flows from the top downwards. The generated flash vapor is passed through the monomer/oligomer mixture to receive an intensive intermix at reducing pressure for highest reaction rate. An additional catalyst is injected in the lowest cascade to activate the prepolycondensation stage, which starts in the fourth cascade.

Then, the resulting oligomer melt is transferred into a first CSTR for prepolymerization. In a design modification not disclosed by Lurgi Zimmer, after achieving the desired molecular weight, the prepolymer is continuously transferred into a second CSTR to achieve the desired molecular weight and carboxylic acid end group concentration prior to finishing in the DRR. The polycondensation reaction takes place in the finishing DRR reactor. The resulting PBT is then pelletized.

All PBT resin grades can be produced using this process design. It is not necessary to employ additional reactors or "change out" reactors, as in the Hitachi process for example, where a biaxial reactor is necessary to deal with the high melt viscosity of PBT of high IV.

Process and Device Description

As indicated, the process of the invention provides for continuous production of high molecular weight PBT based on the esterification and/or transesterification of PTA with BDO in the presence of TPT with simultaneous formation of a prepolymer and polycondensation thereof to afford high molecular weight PBT. The process involves the following particular steps and conditions.

Mixing

In step (a), PTA and BDO are combined in a slurry paste vessel or other mixer to form a mixture. The mixture may take the form of a paste, a slurry, or a mixture of both a paste and a slurry ("slurry paste"). The mole ratio of BDO to PTA is typically 1.2:1 to 2.5:1. More particularly, the mole ratio of BDO to PTA is 1.3:1 to 2.0:1, specifically 1.35:1 to 1.75:1. In some embodiments, the mole ratio of BDO to PTA is 1.3:1 to 2.5:1. All references herein to the mole ratio of BDO to PTA relate to the mole ratio of the monomers and do not account for BDO and PTA residues in oligomers and polymers.

The temperature, pressure, and a residence time in the mixer are sufficient to allow the slurry/paste to form. Thus, the temperature in the mixer is typically maintained at 20 to 110° C. More particularly, the temperature in the mixture is maintained at 50 to 100° C., specifically 70 to 90° C. The pressure in the mixer is typically maintained at 0.1 to 1.1 bar. More particularly, the pressure in the mixture is maintained at 0.8 to 1.05 bar, specifically 0.9 to 1.02 bar.

The residence time in the mixer is typically 1 to 4 hours. More particularly, the residence time in the mixer is 2.5 to 3.5 hours.

In some embodiments, the temperature in the slurry paste vessel is maintained between 70° C. and 90° C., the pressure is maintained between 0.9 and 1.05 bar, and the residence time is 2.5 hours to 3.5 hours. In some embodiments, the throughput of BDO and PTA in the slurry paste vessel is 7,000 to 10,000 kilograms/hour.

Tower Reactor

In step (b), the product of step (a) is then continuously supplied from the slurry paste vessel to the tower reactor. Tower reactors are known in the art and are exemplified, for instance by those disclosed in U.S. Pat. Nos. 7,259,227, 7,608,225, 8,110,149, and 8,252,888 to Schulz van Endert et al. The tower reactor replaces the first three reactors of a typical, conventional PBT polycondensation plant. The tower reactor combines all the relevant reaction sections within a single reactor and is characterized by the liquid film that flows down the inner surface of its vertical tubes to produce the prepolymer. Advantageously, the tower reactor for use in the present invention is characterized by: low energy and maintenance costs; high raw material yield; excellent color values; short reaction times at low temperatures; fast, optimized esterification and polycondensation; hold up time of only three hours from raw material to polymer; low side product generation due to large heat exchanger surfaces and low wall temperatures; minimal oligomer formation and losses; and vacuum generated by steam from reaction. More particularly, the tower reactor is an ESPREE™ reactor, commonly available from Uhde Inventa Fischer.

Thus, the mixture from the slurry paste vessel is continuously supplied to a tower reactor having a plurality of reactor zones for at least one of esterification or transesterification, wherein the esterification or transesterification occurs continuously, simultaneously, and uninterruptedly until prepolycondensation occurs. The plurality of reactor zones in the tower reactor of step (b) are configured such that the lower third of the tower reactor is in the form of a hydrocyclone with attached heat exchanger, and the hydrocyclone (i) has a supply line from the mixer of step (a); and (ii) is connected via a pressure pipe to the top side of the tower reactor. The top side of the tower reactor is configured in the form of a downflow cascade and the cascade is in communication via a pipe with the central part of the tower reactor.

In step (b1), the product of step (a) is subjected to the esterification section with a treatment temperature in the range of 170 to 270° C. and a treatment pressure in the range of 0.5 to 1 bar; a first quantity of between 60 and 120 ppm of the catalyst tetraisopropyl titanate (TPT) is supplied; the ratio of BDO to PTA is 1.6:1 to 3:1; and water, tetrahydrofuran (THF), and BDO are removed from the esterification section as overheads. More particularly, the treatment temperature is in the range of 230° C. to 250° C., the treatment pressure is in the range of 0.5 to 0.9 bar and the residence time is 70 to 150 minutes; a first quantity of between 60 and 110 ppm of the catalyst tetraisopropyl titanate (TPT) is supplied; and water, tetrahydrofuran (THF), and BDO are removed from the esterification section as overheads. More particularly, the treatment temperature is in the range of 240° C. to 250° C., the treatment pressure is in the range of 0.65 to 0.85 bar and the residence time is 80 to 120 minutes.

In some embodiments, the mixture from step (a) is subjected to the esterification section of the tower reactor of step (b) with a treatment temperature in the range of 230° C. to 250° C., a treatment pressure in the range of 0.5 to 0.9 bar and a residence time of 70 to 150 minutes; a first quantity of between 60 and 120 ppm of the catalyst tetraisopropyl titanate (TPT) is supplied; and water, tetrahydrofuran (THF), and BDO are removed from the esterification section as overheads.

In some embodiments, in the esterification section of the tower reactor of step (b), BDO and PTA are present in a mole ratio of 1.6:1 to 3:1, specifically 1.8:1 to 2.8:1, more specifically 2:1 to 2.67:1. In some embodiments, step (b1) is characterized by a throughput of 7,000 to 10,000 kilograms/hour.

In some embodiments, the mixture from step (a) is subjected to the esterification section of the tower reactor of step (b) with a treatment temperature in the range of 240° C. to 250° C., a treatment pressure in the range of 0.65 to 0.85 bar, a residence time of 80 to 120 minutes. In some embodiments, in step (b1), BDO and PTA are present in a mole ratio of 1.8:1 to 3.0:1.

In some embodiments, step (b1) is characterized by a throughput of 7,000 to 10,000 kilograms/hour.

Next, in step (b2), the product from step (b1) is transferred continuously into a pipe stretch and maintained at a temperature in the range of 200 to 280° C. and a pressure in the range of 1 to 10 bar, while supplying 0.03 to 0.05 mole BDO. In some embodiments, step (b2) has a residence time of between 2 and 8 minutes.

In some embodiments, the product of step (b1) is transferred continuously into a pipe stretch and maintained at a temperature in the range of 200° C. to 280° C. and a pressure in the range of 1 to 10 bar, while supplying 0.03 to 0.05 mole BDO.

In some embodiments, the pressure in the pipe stretch is maintained between 1 and 10 bar, the temperature in the pipe stretch is maintained between 200° C. and 280° C., and the residence time in the pipe stretch is between 2 and 8 minutes.

In step (b3), the product of step (b2) is transferred continuously to the cascade postesterification part of the tower reactor, which consists of four different cascades, wherein the pressure of each cascade is subsequently reduced from 1 bar to 0.2 bar, the temperature of each cascade is subsequently increased from 230 to 270° C., the residence time for each cascade is set between 2 and 30 minutes, specifically between 5 and 25 minutes, and a second quantity of TPT catalyst between 25 and 100 ppm diluted with 0.02 to 0.2 mol of BDO is supplied into the fourth cascade zone of the post-esterification part of the tower reactor. Reference to the pressure of each cascade being "subsequently reduced" from 1 bar to 0.15 bar means that the pressure is reduced from one cascade stage to the next cascade stage. Similarly, reference to the temperature of each cascade being "subsequently increased" means that the temperature is increased from one cascade stage to the next. Typically the product of step (b3) has an IV of between 0.1 and 0.2 dl/g and a CEG of between 10 and 100 mmol/kg with a conversion of between 95 and 99.5% based on free PTA. More particularly, the product of step (b3) has an IV of between 0.12 and 0.18 dl/g and a CEG of between 15 and 80 mmol/kg, with a conversion of between 97 and 99.5% based on free PTA. In some embodiments, BDO and PTA are combined in a mole ratio of 1.6:1 to 4:1 in step (a), and in step (b3) the residence time for each cascade is between 5 and 25 minutes. In some embodiments, the product of step (b3) has an intrinsic viscosity of between 0.1 and 0.2 dl/g and a carboxylic acid end group concentration of between 10 and 100 mmol/kg, with a conversion of between 95 and 99.5% based on free PTA.

In some embodiments, step (b3) is characterized by a throughput of 7,000 to 10,000 kilograms/hour.

In step (b4), water, THF, byproducts, and excess BDO from steps (b1), (b2), and (b3) are removed. BDO is purified and directed back again to the individual reaction steps.

Continuously Stirred Tank Reactors

In step (c), the product obtained from step (b3) is continuously supplied to a first continuously stirred tank reactor, wherein the product of step (b3) is subjected to a melt temperature of 225 to 250° C., a pressure of 5 to 70 mbar, and a residence time between 10 and 60 minutes, specifically between 30 and 55 minutes. More particularly, the product obtained from step (b3) is continuously supplied to a first continuously stirred tank reactor, wherein the product of step (b3) is subjected to a melt temperature of 235 to 245° C., a pressure of 5 to 60 mbar, preferably 5 to 40 mbar, more preferably 5 to 30 mbar, and a residence time between 30 and 50 minutes. In some embodiments, step (c) is characterized by a throughput of 7,000 to 10,000 kilograms/hour.

In step (d), the product obtained from step (c) is continuously supplied to a second continuously stirred tank reactor, wherein the product of step (c) is subjected to a melt temperature of 230 to 260° C., specifically 240 to 250° C., a pressure of 0.1 to 35 mbar and a residence time between 10 and 60 minutes. More particularly, the product obtained from step (c) is continuously supplied to a second continuously stirred tank reactor, wherein the product of step (c) is subjected to a melt temperature of 235 to 250° C., a pressure of 0.1 to 16 mbar and a residence time between 20 and 60 minutes. The product leaving the second CSTR reactor typically has an IV of between 0.20 and 0.40 dl/g and carboxylic end group concentration of 0.1 to 40 mmol/kg.

In some embodiments, step (d) is characterized by a throughput of 7,000 to 10,000 kilograms/hour.

Disc Ring Reactor

In step (e), the product from step (d) is continuously transferred to a dual shafts disc ring reactor with independent revolutions per minute (rpm), wherein the product of step (d) is subjected to a melt temperature of 230 to 255° C. and a pressure of 0.1 to 16 mbar, a rotation rate for each of the dual shafts that is independently 1 to 5 rpm, and a residence time of 30 minutes to 6 hours.

In some embodiments, step (e) is characterized by a throughput of 7,000 to 10,000 kilograms/hour.

Pelletizer

In step (f) the product of step (e) is continuously fed into a pelletizer and is pelletized. The resulting PBT product has an IV of between 0.55 and 1.35 dl/g and a CEG concentration of between 0.1 and 60 mmol/kg.

PBT Resin Grades

Various resin grades can be produced by varying process parameters in the CSTR and DRR components of the process. The target IV, CEG, and melt viscosity (MV) properties of resulting resins are given in Table 1.

TABLE 1

Properties of PBT grades delivered from continuous pilot plant.

| | IV (dl/g) | | CEG (mmol/kg) | | MV (Pa · s (Poise)) | |
|---|---|---|---|---|---|---|
| PBT | Low | High | Low | High | Low | High |
| PBT 1 | 1.10 | 1.25 | 35 | 45 | 750.0 (7500) | 950.0 (9500) |
| PBT 2 | 0.68 | 0.72 | | 24 | 74.0 (740) | 90.0 (900) |
| PBT 3 | 0.55 | 0.59 | | 12 | 20.0 (200) | 40.0 (400) |
| PBT 4 | 0.95 | 1.0 | | 40 | 350.0 (3500) | 450.0 (4500) |
| PBT 5 | 0.78 | 0.82 | | 40 | 145.0 (1450) | 185.0 (1850) |

Device for Continuous Preparation of PBT

One embodiment is a device for the continuous preparation of polybutylene terephthalate, comprising:

(a) a slurry paste vessel, wherein 1,4-butane diol (BDO) and purified terephthalic acid (PTA) are combined in a mole ratio of 1.2:1 to 2.5:1, specifically 1.35:1 to 2:1, in a slurry paste vessel to form a mixture, wherein the temperature in the slurry paste vessel is in the range of 20 to 90° C., the pressure in the slurry paste vessel is in the range of 0.8 to 1.1 bar, and the residence time of the mixture in the slurry paste vessel is in the range of 1 to 4 hours;

(b) a tower reactor having a plurality of reactor zones for at least one of esterification or transesterification, wherein the mixture from step (a) is continuously supplied and esterification or transesterification occurs continuously, simultaneously, and uninterruptedly until prepolycondensation occurs; wherein the following conditions are maintained:

(b1) the mixture from step (a) is subjected to the esterification section with a treatment temperature in the range of 170 to 270° C. and a treatment pressure in the range of 0.5 to 1 bar; a first quantity of between 60 and 120 ppm of the catalyst tetraisopropyl titanate (TPT) is supplied; the ratio of BDO to PTA is 1.6:1 to 3:1; and water, tetrahydrofuran (THF), and BDO are removed from the esterification section as overheads;

(b2) the product of step (b1) is transferred continuously into a pipe stretch and maintained at a temperature in the range of 200 to 280° C. and a pressure in the range of 1 to 10 bar, while supplying 0.03 to 0.05 mol BDO;

(b3) the product of step (b2) is transferred continuously to the cascade post-esterification part of the tower reactor, which consists of four different cascades, wherein the pressure of each cascade is subsequently reduced from 1 bar to 0.15 bar, the temperature of each cascade is subsequently increased from 230 to 270° C., the residence time for each cascade is set between 2 and 30 minutes, specifically 5 to 20 minutes, and a second quantity of TPT catalyst between 25 and 100 ppm diluted with 0.02 to 0.2 mol of BDO is supplied into the fourth cascade zone of the post-esterification part of the tower reactor;

(b4) water, THF, byproducts, and excess BDO from steps (b1), (b2), and (b3) are removed and the BDO is purified and directed back again to the individual reaction steps; and then (c) a first continuously stirred tank reactor, wherein the product obtained from step (b3) is continuously supplied to the first continuously stirred tank reactor, wherein the product of step (b3) is subjected to a melt temperature of 225 to 245° C., a pressure of 5 to 70 mbar, preferably 5 to 40 mbar, more preferably 5 to 30 mbar, and a residence time between 10 and 60 minutes;

(d) a second continuously stirred tank reactor, wherein the product obtained from step (c) is continuously supplied to the second continuously stirred tank reactor, wherein the product of step (c) is subjected to a melt temperature of 230 to 260° C., a pressure of 0.1 to 35 mbar and a residence time between 10 and 60 minutes;

(e) a dual shafts disc ring reactor with independent revolutions per minute (rpm), wherein the product from step (d) is continuously transferred to a dual shafts disc ring reactor, wherein the product of step (d) is subjected to a melt temperature of 230 to 255° C. and a pressure of 0.1 to 16 mbar, a rotation rate for each of the dual shafts that is independently 1 to 5 rpm, and a residence time of 30 minutes to 6 hours; and (f) a pelletizer, wherein the product of step (e) is continuously fed into a pelletizer and is pelletized; and wherein:

the plurality of reactor zones in the tower reactor of step (b) are configured such that the lower third of the tower reactor is in the form of a hydrocyclone with attached heat exchanger, and wherein the hydrocyclone has a supply line from the mixer of step (a);

the hydrocyclone is connected via a pressure pipe to the top side of the tower reactor;

the top side of the tower reactor is configured in the form of a downflow cascade; and the cascade is in communication via a pipe with the central part of the tower reactor.

FIG. 1 is a schematic diagram of a device for continuous preparation of polybutylene terephthalate. The device 1 comprises a slurry paste vessel 10, in which BDO and PTA are mixed before being transferred via supply line 30 to tower reactor 20. Tower reactor 20 includes hydrocyclone 40, heat exchanger 50, pressure pipe 60 connecting the upper portion of the heat exchanger 50 to the esterification section 70, and pipe stretch 80 connecting the esterification section 70 to the cascade post-esterification section 90 of the tower reactor 20. Also in the tower reactor 20, pipe 120 connects the lower end of the cascade post-esterification section 90 to first continuously stirred tank reactor 140. Water, THF, byproducts, and excess BDO are vented from the tower reactor 20 via vent 130. Material flows from the first continuously stirred tank reactor 140 to the second continuously stirred tank reactor 150, and from there to one single or two (parallel) dual shaft disc ring reactor(s) 160. Continuing the parallel paths, product PBT is pumped from the dual shaft disc ring reactor(s) 160 to pelletizers 170.

In some embodiments, the residence time of the mixture in the esterification section is in the range of 80 to 120 minutes at an operating throughput between 7,000 kg/hr to 10,000 kg/hr.

Carboxylic End Group Monitoring Process

The invention is also directed to a carboxylic acid end group concentration monitoring process. Accordingly, the CEG concentration monitoring process comprises the steps of:

(a) dissolution of PBT polymer or oligomer in a mixture of solvents at room temperature;

(b) suppression of ionic formation by adding a second substance for sharp equivalence point determination; and (c) titration of solution against potassium hydroxide using potentiometric or colorimetric method after addition of Bromophenol blue indicator.

In some embodiments, the mixture of solvents used in the dissolution step comprises hexafluoro-2-propanol, o-cresol, and dichloromethane. Typically, hexafluoro-2-propanol is present in the mixture of solvents within a concentration range of 2 to 10%; o-cresol is present within a concentration range of 40 to 60%; and dichloromethane is present within a concentration range of 40 to 60%.

The second substance that is used to suppress ionic formation is selected from the group consisting of salts comprising a cation selected from the group consisting of sodium, potassium, calcium, and ammonium; and an anion selected from the group consisting of trifluoroacetate, trifluoropropionate, and trifluoroborate. In some embodiments, the second substance is sodium trifluoroacetate. In these embodiments, the sodium trifluoroacetate is present as the second substance within a concentration range of from 1 to 2 mM.

The CEG monitoring process has a cycle time for polyester titration that is substantially faster than previous monitoring processes. Previous monitoring processes have cycle times of 45 to 90 minutes, while the cycle time of the process disclosed herein is from 15 to 45 minutes. CEG values specified in the claims and working examples are determined according to this method.

General Testing of PBT

The intrinsic viscosity (IV) of the polymer was measured according to ASTM D2857-95 (2007) using an automatic Viscotek Microlab® 500 series Relative Viscometer Y501 wherein 0.5000 g of polymer sample was fully dissolved at 25° C. in a 60/40 mixture (vol %/vol %) of phenol/1,1,2,2-tetrachloroethane.

The intrinsic viscosity (IV) of oligomers and PBT is measured according to ASTM D2857-95 (2007) using an automatic Viscotek Microlab® 500 series Relative Viscometer Y501. 0.5 grams of oligomer sample was fully dissolved in a 60 to 40 mixture (% volume) of phenol and 1,1,2,2-tetrachloroethane solution (Harrell Industries). Two measurements were taken for each sample, and the reported result was the average of the two measurements.

The CEG concentration of oligomers and PBT was measured using Metrohm-Autotitrator including Titrando 907, 800 Dosino, 2 mL and 5 mL dosing units and 814 USB sample processor. All the units are controlled from a PC using Tiamo 2.0 Full version. 1.5-2.0 grams of oligomer was fully dissolved in 50 ml of O-cresol solvent at 80° C. After dissolving, the sample was cooled to room temperature and 50 ml of O-cresol and 1 ml of water were added to the beaker. Sample blank was prepared in the similar way. The electrodes and titrant dosing were dipped into the sample solution and the titration was started. The sample titration was repeated twice and the equivalence point was noted for the calculation of CEG value.

Melt viscosity was determined as a function of time at 265° C. for 30 minutes. This test is also known as "time-sweep". Percent viscosity change was reported.

In certain embodiments, the present inventions also relates to the aspects presented here below.

Aspect 1: A continuous process for preparing polybutylene terephthalate, comprising:

(a) combining 1,4-butane diol (BDO) and purified terephthalic acid (PTA) in a mole ratio of 1.2:1 to 2.5:1 in a slurry paste vessel to form a mixture, wherein the temperature in the slurry paste vessel is in the range of 20 to 90° C., the pressure in the slurry paste vessel is in the range of 0.8 to 1.1 bar, and the residence time of the mixture in the slurry paste vessel is in the range of 1 to 4 hours;

(b) continuously supplying the mixture from step (a) to a tower reactor having a plurality of reactor zones for at least one of esterification or transesterification, wherein the esterification or transesterification occurs continuously, simultaneously, and uninterruptedly until prepolycondensation occurs; wherein the following conditions are maintained:

(b1) the mixture from step (a) is subjected to the esterification section with a treatment temperature in the range of 170 to 270° C. and a treatment pressure in the range of 0.5 to 1 bar; a first quantity of between 60 and 120 ppm of the catalyst tetraisopropyl titanate (TPT) is supplied; the ratio of BDO to PTA is 1.6:1 to 3:1; and water, tetrahydrofuran (THF), and BDO are removed from the esterification section as overheads;

(b2) the product of step (b1) is transferred continuously into a pipe stretch and maintained at a temperature in the range of 200 to 280° C. and a pressure in the range of 1 to 10 bar, while supplying 0.03 to 0.05 mol BDO;

(b3) the product of step (b2) is transferred continuously to a cascade postesterification part of the tower reactor, which consists of four different cascades, wherein the pressure of each cascade is subsequently reduced from 1 bar to 0.15 bar, the temperature of each cascade is subsequently increased from 230 to 270° C., the residence time for each cascade is set between 2 and 30 minutes and a second quantity of TPT catalyst between 25 and 100 ppm diluted with 0.02 to 0.2 mol of BDO is supplied into the fourth cascade zone of the post-esterification part of the tower reactor;

(b4) water, THF, byproducts, and excess BDO from steps (b1), (b2), and (b3) are removed and the BDO is purified and directed back again to the individual reaction steps;

wherein the plurality of reactor zones in the tower reactor of step (b) are configured such that the lower third of the tower reactor is in the form of a hydrocyclone with attached heat exchanger, and wherein the hydrocyclone has a supply line from the mixer of step (a);

the hydrocyclone is connected via a pressure pipe to the top side of the tower reactor;

the top side of the tower reactor is configured in the form of a downflow cascade; and the cascade is in communication via a pipe with the central part of the tower reactor;

(c) the product obtained from step (b3) is continuously supplied to a first continuously stirred tank reactor, wherein the product of step (b3) is subjected to a melt temperature of 225 to 250° C., a pressure of 5 to 70 mbar, and a residence time between 10 and 60 minutes;

(d) the product obtained from step (c) is continuously supplied to a second continuously stirred tank reactor, wherein the product of step (c) is subjected to a melt temperature of 230 to 260° C., a pressure of 0.1 to 35 mbar, and a residence time between 10 and 60 minutes;

(e) the product from step (d) is continuously transferred to a dual shafts disc ring reactor with independent revolutions per minute (rpm) control, wherein the product of step (d) is subjected to a melt temperature of 230 to 255° C., a pressure of 0.1 to 16 mbar, a rotation rate for each of the dual shafts that is independently 1 to 5 rpm, and a residence time of 30 minutes to 6 hours; and (f) the product of step (e) is continuously fed into a pelletizer and is pelletized.

Aspect 2: The process of aspect 1, wherein
in step (a), BDO and PTA are combined in a mole ratio of 1.35:1 to 2.5:1;
in step (b3), the residence time for each cascade is between 5 and 25 minutes.

Aspect 3: The process of aspects 1 or 2, wherein the temperature in the slurry paste vessel is maintained between 70° C. and 90° C., the pressure is maintained between 0.9 and 1.05 bar, and the residence time is 2.5 to 3.5 hours.

Aspect 4: The process of any one of aspects 1-3, wherein the mixture from step (a) is subjected to the esterification section of the tower reactor of step (b) with a treatment temperature in the range of 230° C. to 250° C., a treatment pressure in the range of 0.5 to 0.9 bar and a residence time of 70 to 150 minutes; a first quantity of between 60 and 120 ppm of the catalyst tetraisopropyl titanate (TPT) is supplied; and water, tetrahydrofuran (THF), and BDO are removed from the esterification section as overheads.

Aspect 5: The process of any one of aspects 1-4, wherein in the esterification section of the tower reactor of step (b), BDO and PTA are present in a mole ratio of 1.6:1 to 3.5:1.

Aspect 6: The process of any one of aspects 1-5, wherein the mixture from step (a) is subjected to the esterification section of the tower reactor of step (b) with a treatment temperature in the range of 240° C. to 250° C., a treatment pressure in the range of 0.6 to 0.8 bar, and a residence time of 80 to 120 minutes.

Aspect 7: The process of any one of aspects 1-6, wherein, in step (b1), BDO and PTA are present in a mole ratio of 1.8:1 to 3.0:1.

Aspect 8: The process of any one of aspects 1-7, wherein the product of step (b1) is transferred continuously into a pipe stretch and maintained at a temperature in the range of 200° C. to 280° C. and a pressure in the range of 1 to 10 bar, while supplying 0.03 to 0.05 mole BDO.

Aspect 9: The process of any one of aspects 1-8, wherein the product of step (b3) has an intrinsic viscosity of between 0.1 and 0.2 dL/g and a carboxylic acid end group concentration of between 10 and 100 mmol/kg, with a conversion of between 95 and 99.5% based on free PTA.

Aspect 10: The process of any one of aspects 1-9, wherein the product of step (b3) is subjected to a residence time of from 20 to 120 minutes across one or two continuously stirred tank reactors in series, and is subjected to a melt temperature of 240 to 250° C.

Aspect 11: The process of any one of aspects 1-10, wherein the product of step (b3) is subjected to a residence time of 30-50 minutes in the first and 30-50 minutes in the second continuously stirred tank reactors in series and is subjected to a melt temperature of 240 to 250° C.

Aspect 12: The process of any one of aspects 1-11, wherein the product leaving the second continuously stirred tank reactor has an intrinsic viscosity of 0.22 to 0.40 dl/g and a carboxylic end group concentration of 0.1 to 30 mmol/kg.

Aspect 13: The process of any one of aspects 1-12 wherein the pelletized product of step (f) has an intrinsic viscosity of 0.55 to 1.35 dl/g and a carboxylic acid end group concentration of 0.1 to 60 mmol/kg.

Aspect 14: The process of any one of aspects 1-13 wherein the pelletized product of step (f) is characterized by the following intrinsic viscosity, carboxylic acid end group concentration, and melt viscosity values:

(a) an intrinsic viscosity of 1.10 to 1.25 deciliters per gram, a carboxylic acid end group concentration of 35 to 45 millimoles per kilogram, and a melt viscosity of 750.0 to 950.0 Pa·s (7500 to 9500 poise) measured at 265° C.;

(b) an intrinsic viscosity of 0.95 to 1.0 deciliters per gram, a carboxylic acid end group concentration no greater than 40 millimoles per kilogram, and a melt viscosity of 350.0 to 450.0 Pa·s (3500 to 4500 poise) measured at 265° C.;

(c) an intrinsic viscosity of 0.78 to 0.82 deciliters per gram, a carboxylic acid end group concentration no greater than 40 millimoles per kilogram, and a melt viscosity of 145.0 to 185.0 Pa·s (1450 to 1850 poise) measured at 265° C.;

(d) an intrinsic viscosity of 0.68 to 0.72 deciliters per gram, a carboxylic acid end group concentration no greater than 24 millimoles per kilogram, and a melt viscosity of 74.0 to 90.0 Pa·s (740 to 900 poise) measured at 265° C.; or (e) an intrinsic viscosity of 0.55 to 0.59 deciliters per gram, a carboxylic acid end group concentration no greater than 12 millimoles per kilogram, and a melt viscosity of 20.0 to 40.0 Pa·s (200 to 400 poise) measured at 265° C.

Aspect 15: A device for the continuous preparation of polybutylene terephthalate, comprising:

(a) a slurry paste vessel, wherein 1,4-butane diol (BDO) and purified terephthalic acid (PTA) are combined in a mole ratio of 1.2:1 to 2.5:1 in a slurry paste vessel to form a mixture, wherein the temperature in the slurry paste vessel is in the range of 20 to 90° C., the pressure in the slurry paste vessel is in the range of 0.8 to 1.1 bar, and the residence time of the mixture in the slurry paste vessel is in the range of 1 to 4 hours;

(b) a tower reactor having a plurality of reactor zones for at least one of esterification or transesterification, wherein the mixture from step (a) is continuously supplied and esterification or transesterification occurs continuously, simultaneously, and uninterruptedly until prepolycondensation occurs; wherein the following conditions are maintained:

(b1) the mixture from step (a) is subjected to the esterification section with a treatment temperature in the range of 170 to 270° C. and a treatment pressure in the range of 0.5 to 1 bar; a first quantity of between 60 and 100 ppm of the catalyst tetraisopropyl titanate (TPT) is supplied; and water, tetrahydrofuran (THF), and BDO are removed from the esterification section as overheads;

(b2) the product of step (b1) is transferred continuously into a pipe stretch and maintained at a temperature in the range of 200 to 280° C. and a pressure in the range of 1 to 10 bar, while supplying 0.03 to 0.05 mol BDO;

(b3) the product of step (b2) is transferred continuously to the cascade post-esterification part of the tower reactor, which consists of four different cascades, wherein the pressure of each cascade is subsequently reduced from 1 bar to 0.15 bar, the temperature of each cascade is subsequently increased from 230 to 270° C., the residence time for each cascade is set between 2 and 30 minutes and a second quantity of TPT catalyst between 25 and 100 ppm diluted with 0.02 to 0.2 mol of BDO is supplied into the fourth cascade zone of the post-esterification part of the tower reactor;

(b4) water, THF, byproducts, and excess BDO from steps (b1), (b2), and (b3) are removed and the BDO is purified and directed back again to the individual reaction steps;

wherein the plurality of reactor zones in the tower reactor of step (b) are configured such that the lower third of the tower reactor is in the form of a hydrocyclone with attached heat exchanger, and wherein the hydrocyclone has a supply line from the mixer of step (a);

the hydrocyclone is connected via a pressure pipe to the top side of the tower reactor;

the top side of the tower reactor is configured in the form of a downflow cascade; and the cascade is in communication via a pipe with the central part of the tower reactor;

(c) a first continuously stirred tank reactor, wherein the product obtained from step (b3) is continuously supplied to the first continuously stirred tank reactor, wherein the product of step (b3) is subjected to a melt temperature of 225 to 250° C., a pressure of 5 to 70 mbar, and a residence time between 10 and 60 minutes;

(d) a second continuously stirred tank reactor, wherein the product obtained from step (c) is continuously supplied to the second continuously stirred tank reactor, wherein the product of step (c) is subjected to a melt temperature of 230 to 260° C., a pressure of 0.1 to 35 mbar and a residence time between 10 and 60 minutes;

(e) a dual shafts disc ring reactor with independent revolutions per minute (rpm), wherein the product from step (d) is continuously transferred to a dual shafts disc ring reactor, wherein the product of step (d) is subjected to a melt temperature of 230 to 255° C. and a pressure of 0.1 to 16 mbar, a rotation rate for each of the dual shafts that is independently 1 to 5 rpm, and a residence time of 30 minutes to 6 hours; and (f) a pelletizer, wherein the product of step (e) is continuously fed into a pelletizer and is pelletized.

Aspect 16: A CEG concentration monitoring process comprising the steps of:

(a) dissolution of PBT polymer or oligomer in a mixture of solvents at room temperature;

(b) suppression of ionic formation by adding a second substance for sharp equivalence point determination; and (c) titration of solution against potassium hydroxide using potentiometric or colorimetric method after addition of Bromophenol blue indicator.

Aspect 17: The process of aspect 16, wherein mixture of solvents comprises hexafluoro-2-propanol, o-cresol, and dichloromethane.

Aspect 18: The process of aspect 16 or 17, wherein second substance is selected from the group consisting of salts comprising a cation selected from the group consisting of sodium, potassium, calcium, and ammonium; and an anion selected from the group consisting of trifluoroacetate, trifluoropropionate, and trifluoroborate.

Aspect 19: The process of any one of aspects 16-18, wherein hexafluoro-2-propanol is present in the mixture of solvents within a concentration range of from about 2% to about 10%, o-cresol is present within a concentration range of from about 40% to about 60%, dichloromethane is present within a concentration range of from about 40% to about 60%; and wherein sodium trifluoroacetate is present as the second substance within a concentration range of 1 to 2 millimolar.

Aspect 20: The process of any one of aspects 16-19, wherein the CEG concentration monitoring process is completed in 15 to 45 minutes.

The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

Example Alternative Process for Determining CEG Concentration

Complete dissolution of the polymer sample is critical in order to obtain reproducible and accurate values.

The samples were prepared offline and transferred into disposable beakers before placing them onto the sample changer of automated titrator. CEG values for both process samples as well as the Resin grades mentioned in the table below were determined using the titration procedure.

About 0.25 grams of sample was weighed accurately and transferred into a 2 oz. glass bottle. 2 ml of hexafluoro-2-propanol was dispensed into the 2 oz. glass bottle along with a 25 mL of o-cresol/dichloromethane (75%/25% in volume ratio) mixture and the bottle was capped. The bottle was placed in an ultrasonic sonicator until the samples are completely dissolved. It is observed that samples of higher molecular weight species of polyesters required longer dissolution time compared to the lower molecular weight species. Once the dissolution was complete, samples were transferred to a disposable 150 mL polypropylene beaker. 25 ml of o-cresol/dichloromethane (75%/25% in volume ratio) mixture was added to the 2 oz. bottle to completely transfer the contents. 20 mL of dichloromethane in two aliquots is used further to rinse the bottle and completely transfer without loss to the disposable polypropylene beaker. No precipitation was observed during dilution with dichloromethane. To this 200 µL of the 500 mM sodium trifluoroacetate solution in methanol is added and mixed well. To this solution was pipetted 5 drops of bromophenol blue indicator solution. (The bromophenol blue indicator is prepared by dissolving approx. 0.25 g bromophenol blue in 50 mL methanol). The titration is performed potentiometrically or colorimetrically. The probe used in this colorimetric titration was an Optrode colorimetric probe (Metrohm), which monitors color change for equivalence point determination. The best results were obtained using 610 nm wavelength setting on the probe. Metrohm automated titration equipment was attached to a sample changer system (Metrohm USA, Riverview, Fla.) in this example.

The results are shown in the following table, where the comparative examples are representative of commercial PBT grades.

| PBT | CEG (mmol/Kg) |
|---|---|
| C. Ex. 1 | 7 |
| C. Ex. 2 | 7 |
| C. Ex. 3 | 20 |

-continued

| PBT | CEG (mmol/Kg) |
|---|---|
| C. Ex. 4 | 41 |
| Process Sample 1 | 99 |
| Process Sample 2 | 164 |

Example 1

A series of experiments 1.1-1.10 were performed in a continuously operating process according to the conditions set out here below.

BDO and PTA were mixed in a mole ratio as presented in table 1A in a slurry paste vessel to form a mixture. The temperature, pressure and residence time in the mixer are presented in table 1A.

TABLE 1A conditions slurry paste vessel and esterification section of tower reactor

| Example | 1.1 | 1.2 | 1.3 | 1.4 | 1.5 | 1.6 | 1.7 | 1.8 | 1.9 | 1.10 |
|---|---|---|---|---|---|---|---|---|---|---|
| Mole ratio BDO/PTA in mixer | 1.43 | 1.43 | 1.43 | 1.44 | 1.43 | 1.43 | 1.42 | 1.41 | 1.35 | 1.32 |
| Temperature mixer (° C.) | 80 | 80 | 79 | 80 | 80 | 80 | 80 | 81 | 79 | 81 |
| Pressure mixer (bar) | 1.03 | 1.03 | 1.04 | 1.03 | 1.04 | 1.04 | 1.04 | 1.04 | 1.04 | 1.04 |
| Residence time mixer (hours) | 3.2 | 3.0 | 2.7 | 3.0 | 2.8 | 3.1 | 3.4 | 3.7 | 3.0 | 3.9 |
| Mole ratio BPD/PTA entering tower | 2.92 | 2.87 | 2.75 | 2.87 | 2.74 | 2.90 | 2.69 | 3.23 | 2.55 | 2.43 |
| First catalyst quantity (ppm) | 100 | 90 | 90 | 90 | 90 | 100 | 70 | 70 | 70 | 70 |
| Temperature esterification (° C.) | 245 | 244 | 246 | 244 | 246 | 243 | 247 | 245 | 244 | 244 |
| Treatment pressure (bar) | 0.79 | 0.79 | 0.79 | 0.79 | 0.79 | 0.79 | 0.79 | 0.79 | 0.79 | 0.79 |
| Residence time tower reactor (hours) | 1.46 | 1.46 | 1.28 | 1.45 | 1.31 | 1.44 | 1.65 | 1.59 | 1.45 | 1.92 |

The slurry paste from the mixer was mixed with additional BDO such that the BDO:PTA ratio was as listed in table 1B before being transferred to a tower reactor where an esterification process occurred in the lower section of the reactor. A first quantity of TPT catalyst as presented in table 1B was supplied in the esterification section. The treatment temperatures, pressure and residence time in the esterification section are listed in table 1B.

The product from the esterification section was transferred continuously to the cascade post-esterification part of the tower reactor which consisted of four different cascades. The temperature and residence time in each cascade are listed in table 1B. The pressure in the top cascade and the pressure in the fourth-from-top cascade are listed in table 1B. The pressure of the post-esterification section was gradually decreased from the top cascade to the bottom cascade. In the fourth from top cascade, a second quantity of TPT catalyst diluted with 0.2 mole of BDO as listed in table 1B was supplied. The IV and CEG of the product at the end of the post-esterification section are listed in table 1B.

TABLE 1B conditions cascade post-esterification section tower reactor and product properties

| Example | 1.1 | 1.2 | 1.3 | 1.4 | 1.5 | 1.6 | 1.7 | 1.8 | 1.9 | 1.10 |
|---|---|---|---|---|---|---|---|---|---|---|
| Temperature top cascade (° C.) | 241 | 241 | 239 | 240 | 239 | 241 | 242 | 242 | 242 | 244 |
| Residence time top cascade (min) | 14 | 14 | 12 | 13 | 12 | 13 | 15 | 15 | 14 | 18 |
| Temp. second from top cascade (° C.) | 242 | 242 | 240 | 241 | 240 | 242 | 242 | 243 | 243 | 244 |
| Res. time second from top cascade (min) | 10 | 10 | 8 | 9 | 8 | 10 | 10 | 11 | 10 | 13 |
| Temp. third from top cascade (° C.) | 242 | 242 | 244 | 244 | 244 | 244 | 245 | 245 | 246 | 245 |

TABLE 1B-continued conditions cascade post-esterification section tower reactor and product properties

| Example | 1.1 | 1.2 | 1.3 | 1.4 | 1.5 | 1.6 | 1.7 | 1.8 | 1.9 | 1.10 |
|---|---|---|---|---|---|---|---|---|---|---|
| Res. time third from top cascade (min) | 10 | 10 | 8 | 9 | 8 | 9 | 10 | 10 | 10 | 13 |
| Temp. fourth from top cascade (° C.) | 245 | 245 | 247 | 245 | 247 | 245 | 246 | 246 | 246 | 245 |
| Res. time fourth from top cascade (min) | 15 | 14 | 16 | 13 | 15 | 14 | 18 | 17 | 17 | 17 |
| Pressure top cascade (bar) | 0.30 | 0.28 | 0.29 | 0.28 | 0.29 | 0.31 | 0.28 | 0.29 | 0.28 | 0.26 |
| Pressure fourth from top cascade (bar) | 0.22 | 0.23 | 0.23 | 0.22 | 0.22 | 0.23 | 0.22 | 0.23 | 0.25 | 0.22 |
| Second catalyst quantity (ppm) | 80 | 80 | 80 | 80 | 80 | 70 | 100 | 100 | 100 | 100 |
| IV of product from post-esterification (dl/g) | 0.14 | 0.15 | | 0.15 | 0.14 | 0.14 | 0.14 | 0.14 | 0.14 | 0.15 |
| CEG of product from post-esterification (mmol/kg) | 25 | 22 | 35 | 22 | 35 | 31 | 20 | 25 | 21 | 28 |

The product from the post-esterification section was continuously supplied to the first continuously stirred tank reactor (CSTR 1). The melt temperature, pressure and residence time in CSTR 1 are listed in table 1C. The product from CSTR 1 was continuously supplied to a second continuously stirred tank reactor (CSTR 2). The melt temperature, pressure and residence time in CSTR 2 are listed in table 1C. The IV and CEG of the product leaving CSTR 2 are listed in table 1C.

The product from CSTR 2 was continuously transferred to a dual shafts ring reactor with independent revolutions per minute (rpm). The melt temperature, pressure and residence time in the ring reactor are listed in table 1C. Each of the two disc ring reactor shaft rotation rates was independently between 1 and 5 rpm. The IV and CEG of the resulting products are listed in table 1C.

The oligomer was continuously supplied to the first continuously stirred tank reactor (CSTR 1). The melt temperature, pressure and residence time in CSTR 1 are listed in table 2. The product from CSTR 1 was continuously supplied to a second continuously stirred tank reactor (CSTR 2). The melt temperature, pressure and residence time in CSTR 2 are listed in table 2. The IV and CEG of the product leaving CSTR 2 are listed in table 2.

The product from CSTR 2 was continuously transferred to a dual shafts ring reactor with independent revolutions per minute (rpm). The melt temperature, pressure and residence time in the ring reactor are listed in table 2. Each of the two disc ring reactor shaft rotation rates was independently between 1 and 5 rpm. The IV and CEG of the resulting products are listed in table 2.

TABLE 1C conditions CSTR's and ring reactor and product properties

| Example | 1.1 | 1.2 | 1.3 | 1.4 | 1.5 | 1.6 | 1.7 | 1.8 | 1.9 | 1.10 |
|---|---|---|---|---|---|---|---|---|---|---|
| Melt temp CSTR 1 (° C.) | 240 | 240 | 242 | 240 | 242 | 242 | 241 | 241 | 241 | 240 |
| Pressure CSTR 1 (mbar) | 32 | 32 | 32 | 32 | 32 | 32 | 32 | 32 | 32 | 32 |
| Residence time CSTR 1 (min) | 38 | 41 | 27 | 41 | 28 | 40 | 49 | 48 | 48 | 60 |
| Melt temp CSTR 2 (° C.) | 240 | 241 | 242 | 241 | 242 | 242 | 242 | 242 | 242 | 241 |
| Pressure CSTR 2 (mbar) | 27 | 27 | 27 | 27 | 27 | 27 | 27 | 27 | 27 | 27 |
| Residence time CSTR 2 (min) | 46 | 45 | 40 | 45 | 41 | 45 | 52 | 49 | 62 | 58 |
| IV of product from CSTR 2 (dl/g) | 0.27 | 0.24 | 0.25 | 0.24 | 0.25 | 0.26 | 0.26 | 0.26 | 0.25 | 0.28 |
| CEG of product from CSTR 2 (mmol/kg) | 15 | 10 | 16 | 10 | 16 | 9 | 16 | 11 | 16 | 15 |
| Melt temp. ring reactor (° C.) | 239 | 239 | 240 | 241 | 240 | 240 | 240 | 240 | 240 | 240 |
| Pressure ring reactor (mbar) | 4.4 | 4.3 | 4.8 | 0.5 | 0.5 | 0.7 | 0.8 | 0.9 | 0.5 | 0.9 |
| Residence time ring reactor (hours) | 3.0 | 2.5 | 3.0 | 3.0 | 2.5 | 3.0 | 2.0 | 1.5 | 2.5 | 1.5 |
| IV of product from ring reactor (dl/g) | 0.70 | 0.70 | 0.69 | 1.14 | 1.17 | 1.03 | 0.98 | 0.97 | 1.07 | 0.87 |
| CEG of product from ring reactor (mmol/kg) | 33 | 27 | 34 | 43 | 45 | 36 | 33 | 32 | 37 | 33 |

Comparative Example 2

A series of experiments 2.1-2.3 were performed using a butylene terephthalate oligomer produced using dimethyl-terephthalate and butanediol, having an IV of 0.13 dl/g and a CEG of 7 mmol/kg. This oligomer, being a product of the post-esterification section of the PBT production process, was subjected to polycondensation via two CSTR's in series and a subsequent ring reactor similar to examples 1.1-1.10.

TABLE 2 conditions CSTR's and ring reactor and product properties of comparative examples

| | Example | | |
|---|---|---|---|
| | 2.1 | 2.2 | 2.3 |
| Melt temp CSTR 1 (° C.) | 230 | 230 | 230 |
| Pressure CSTR 1 (mbar) | 53 | 53 | 53 |

TABLE 2-continued conditions CSTR's and ring reactor and product properties of comparative examples

| | Example | | |
|---|---|---|---|
| | 2.1 | 2.2 | 2.3 |
| Residence time CSTR 1 (min) | 40 | 40 | 40 |
| Melt temp CSTR 2 (° C.) | 240 | 240 | 240 |
| Pressure CSTR 2 (mbar) | 26 | 26 | 26 |
| Residence time CSTR 2 (min) | 40 | 40 | 40 |
| IV of product from CSTR 2 (dl/g) | 0.30 | 0.30 | 0.30 |
| CEG of product from CSTR 2 (mmol/kg) | 10 | 10 | 10 |
| Melt temp. ring reactor (° C.) | 239 | 242 | 242 |
| Pressure ring reactor (mbar) | 4 | 2.75 | 2.6 |
| Residence time ring reactor (hours) | 2.0 | 2.5 | 3.0 |
| IV of product from ring reactor (dl/g) | 0.78 | 0.96 | 1.15 |
| CEG of product from ring reactor (mmol/kg) | 27 | 45 | 49 |

The above examples demonstrate that the process according to the current invention, wherein the conditions of the polycondensation section, in particular the lower pressure of the first CRST, allow for the production of PBT with desired high IV and desired low CEG using an oligomer produced based on PTA and butanediol having a higher CEG.

The invention claimed is:

1. A device for operating a continuous process for preparing polybutylene terephthalate, the device comprising:
   (1) a slurry paste vessel, wherein 1,4-butane diol (BDO) and purified terephthalic acid (PTA) are combined to form a mixture;
   (2) a tower reactor to which the mixture from the slurry paste vessel (1) is supplied for at least one of esterification or transesterification, the tower reactor having a plurality of reactor zones configured that a lower third of the tower reactor is in the form of a hydrocyclone with attached heat exchanger, and wherein the hydrocyclone has a supply line from the slurry paste vessel (1), the hydrocyclone being connected to a top side of the tower reactor, the top side of the tower reactor being configured in the form of a downflow cascade, wherein the following conditions are maintained:
   (b1) the mixture from the slurry paste vessel (1) is subjected to an esterification section with a treatment temperature in the range of 170 to 270° C. and a treatment pressure in the range of 0.5 to 1 bar; a first quantity of catalyst is supplied;
   (b2) the product of (b1) is transferred continuously into a pipe stretch while optionally a quantity of BDO is supplied;
   (b3) the product of (b2) is transferred continuously to a cascade postesterification part of the tower reactor, comprising multiple cascades in series, wherein the pressure of each cascade is subsequently reduced to ultimately ≤0.25 bar, and optionally a second quantity of catalyst is supplied into the last cascade zone of the post-esterification part of the tower reactor;
   (3) a first continuously stirred tank reactor to which the product from (b3) is supplied, wherein the product from (b3) is subjected to a melt temperature of 225 to 250° C., a pressure of 5 to 40 mbar, and a residence time between 10 and 60 minutes;
   (4) an optional second continuously stirred tank reactor to which the product from the first continuously stirred tank reactor (3) is supplied,
      wherein the product from the first continuously stirred tank reactor (3) is subjected to a melt temperature of 230 to 260° C., a pressure of 0.1 to 35 mbar, and a residence time between 10 and 60 minutes;
   (5) a dual shaft ring reactor to which the product from the first continuously stirred tank reactor (3) or, where the second continuously stirred tank reactor (4) is used, the product from the second continuously stirred tank reactor (4), is supplied,
      wherein the product from the tank reactor (3) or the product from the tank reactor (4) is subjected to a melt temperature of 230 to 255° C., a pressure of 0.1 to 16 mbar, and a residence time of 30 minutes to 6 hours; and
   (6) a pelletizer where the product from the dual shaft ring reactor (5) is continuously fed and pelletized.

* * * * *